United States Patent
Mino

(10) Patent No.: US 8,086,395 B2
(45) Date of Patent: Dec. 27, 2011

(54) IN-VEHICLE NAVIGATION SYSTEM

(75) Inventor: Kosei Mino, Aichi (JP)

(73) Assignee: Aisin AW Co., Ltd., Aichi (JP)

( * ) Notice: Subject to any disclaimer, the term of this patent is extended or adjusted under 35 U.S.C. 154(b) by 393 days.

(21) Appl. No.: 12/488,743

(22) Filed: Jun. 22, 2009

(65) Prior Publication Data

US 2009/0319179 A1    Dec. 24, 2009

(30) Foreign Application Priority Data

Jun. 23, 2008  (JP) ................................ 2008-162937

(51) Int. Cl.
*G01C 21/00* (2006.01)
(52) U.S. Cl. ...................................................... 701/200
(58) Field of Classification Search .................. 701/36, 701/200, 207, 213
See application file for complete search history.

(56) References Cited

U.S. PATENT DOCUMENTS

2010/0004853 A1 * 1/2010 Siereveld et al. ............. 701/201

FOREIGN PATENT DOCUMENTS

JP       2001-227963 A    8/2001

* cited by examiner

*Primary Examiner* — Kim T Nguyen
(74) *Attorney, Agent, or Firm* — Lowe Hauptman Ham & Berner LLP

(57) ABSTRACT

An in-vehicle navigation system includes a navigation device that further includes a receiving unit configured to receive information, a storage unit configured to store the received information, and a guidance unit. The navigation system further includes: a battery voltage detector; a temperature sensor; and a control device. The control device includes: a determination unit and a start-up control unit configured to periodically start the navigation device while the vehicle's engine is off, or cancel start-up of the navigation device based upon the detected battery voltage, a predetermined voltage level, and current and/or predicted temperatures.

3 Claims, 4 Drawing Sheets

INFORMATION RECEIVED WHILE
PARKED

FIG. 4a

TO PREVENT BATTERY RUNOUT,
INFORMATION WAS NOT RECEIVED WHILE
PARKED

FIG. 4b

IN-VEHICLE NAVIGATION SYSTEM

INCORPORATION BY REFERENCE

The disclosure of Japanese Patent Application No. 2008-162937 filed on Jun. 23, 2008, including the specification, drawings and abstract thereof, is incorporated herein by reference in its entirety.

BACKGROUND OF THE INVENTION

1. Field of the Invention

The present invention relates to in-vehicle navigation systems that periodically acquire information while parking with an engine-off, in which a battery run-out is prevented.

2. Description of the Related Art

Japanese Unexamined Patent Application Publication No. 2001-227963 relates to a navigation system which is started for a predetermined period of time at predetermined intervals to receive information. This function is performed even when parked with the engine off and accessories in a power-off state so that the latest traffic information can be utilized immediately upon start-up of the navigation system via operation of an engine start-up key. The reception of the traffic information is performed only if a monitored battery level exceeds or equals a predetermined threshold level.

SUMMARY OF THE INVENTION

If, as disclosed in Japanese Unexamined Patent Application Publication No. 2001-227963, the disclosed navigation system is started to periodically receive information while parked with the engine off, i.e., battery charging not being performed, the remaining battery capacity decreases. A subsequent engine startup puts a significant drain on the battery and even though the monitored level of the battery exceeded or equaled the threshold level when traffic data was received, a battery can run out of power while attempting an engine startup. This is especially true in a location of low temperature where the cold-cranking capability of a lead battery is diminished and starting a cold engine becomes significantly more difficult. Repeated operation of a starter motor under these conditions can easily drain the battery of whatever remaining capacity there was, rendering the battery incapable of starting the engine.

The embodiments disclosed herein prevent battery run-out that may result from periodic startup of an in-vehicle navigation system to acquire external information, e.g., traffic, news, maps, etc., when the vehicle is parked with the engine-off.

According to at least one embodiment, an in-vehicle navigation system includes a navigation device and a control device that controls the periodic start-up of the navigation device.

In at least some embodiments, the navigation device includes a receiving unit that receives information from external sources, for example, traffic, news, and map information; a storage unit that stores the received information, a current position detection unit, and a guidance unit that provides directional information to the user and displays information pertaining to the information received during the engine off state. a storage unit in which seasonal temperature information by area is stored.

The control device includes a determination unit that receives an output from a battery voltage monitor and an output from a current temperature sensor. The control device further includes a start-up control unit that periodically starts the navigation device when the vehicle is parked with the engine off, wherein the startup command is generated depending upon the detected battery voltage, the current temperature, and predetermined voltage and temperature threshold levels.

The control device refers to temperature information stored in the storage unit of the navigation device and determines whether or not the current position of the vehicle is positioned in an area where a temperature is predicted lower than a predetermined temperature. Based upon input from the determination unit, the start-up control unit periodically starts the navigation device when the vehicle is parked with the engine off.

Accordingly, battery run-out in a vehicle parked with the engine-off may be prevented by canceling start-up of the navigation device when the battery voltage is lower than a predetermined level and the current temperature is lower than a predetermined temperature, or if the vehicle is located in an region where a predicted temperature is lower than a predetermined temperature.

BRIEF DESCRIPTION OF THE DRAWINGS

FIGS. 4A and 4B show examples of a guidance display screen at a time of engine start.

DETAILED DESCRIPTION OF THE PREFERRED EMBODIMENT

Figure 1:
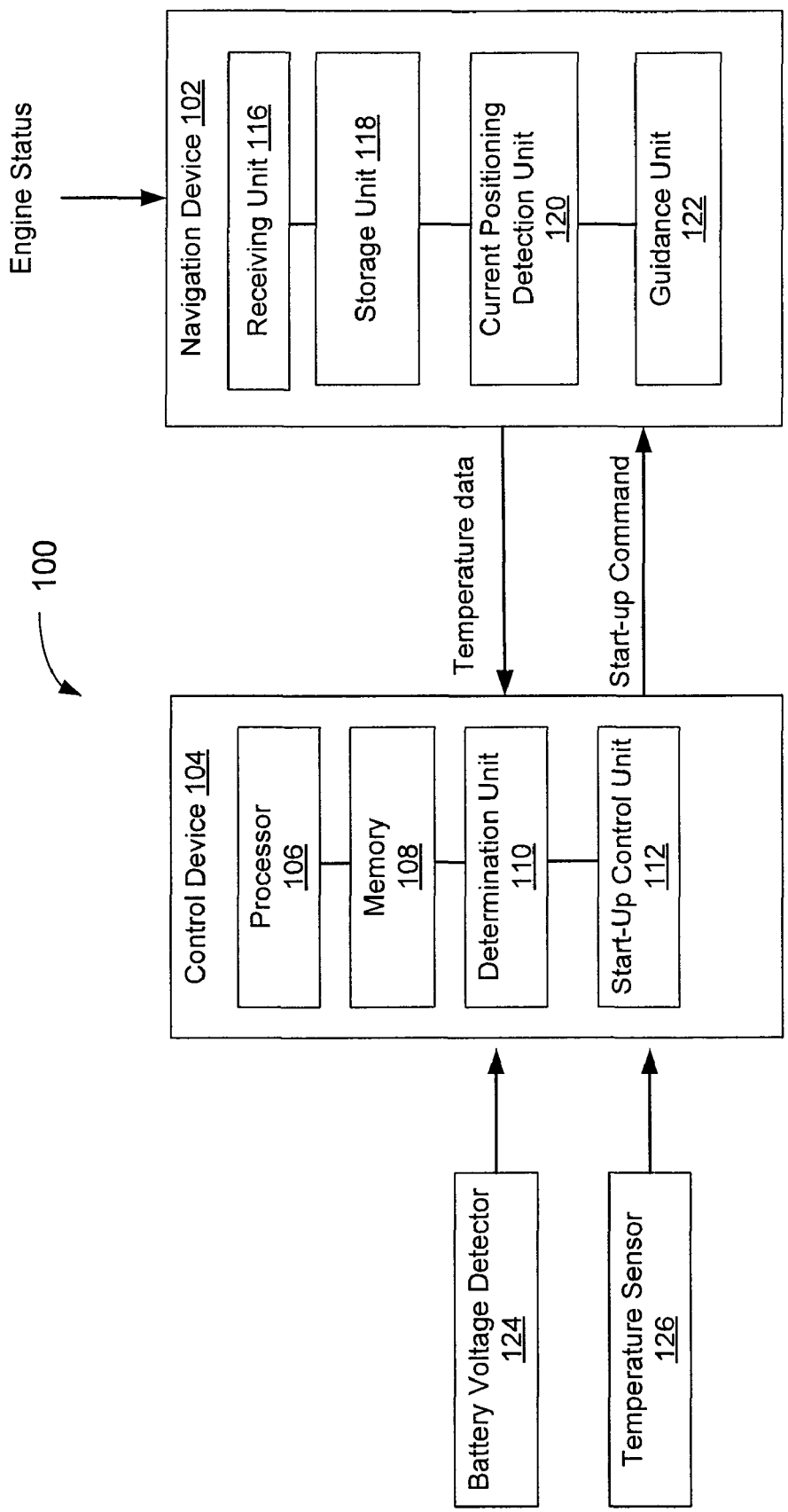
FIG. 1 is a block diagram showing an in-vehicle navigation system in accordance with an embodiment of the present invention.

In accordance with at least one embodiment, FIG. 1 depicts an in-vehicle navigation system 100 that includes a navigation unit 102, a control device 104, a battery voltage detector 124, and a temperature sensor 126.

Navigation device 102 includes a receiving unit 116 that is configured to receive information, i.e., traffic, news, map data, etc., periodically from an external source when the vehicle is powered off. Navigation device 102 further includes a current position detection unit 120 that detects a current location of the vehicle using, for example, Global Positioning System (GPS) technology, and determines whether or not the current position of the vehicle is positioned in a low temperature region. Guidance unit 122 performs navigation functions including providing directions to the user while driving, and in some embodiments includes a display that provides the user with information regarding information received by receiving unit 116 while the engine was not running. Storage unit 118 includes read/writeable memory for storing executable program instructions, information received by receiving unit 116, as well as temperature data used by control unit 104 to enable or cancel the periodical start up navigation device 102.

Vehicles generally use a lead because it is relatively inexpensive and is easy to maintain. However, a lead battery utilizes electrochemical reaction for converting chemical energy to electrical energy and due to its small amount of electrolyte used to perform the electrochemical reaction, lead batteries have a characteristic of being susceptible to a surrounding temperature. The electrochemical reaction becomes active at high temperatures and inactive at low temperatures. An available discharge capacity is remarkably reduced in a low-temperature range below −15 degrees C. A high-temperature range is defined generally as a range not exceeding 50 degrees C. to prevent a deformation or a lifetime decrease of a resin material of a battery case included in the lead battery. In addition, a remaining capacity of the lead battery is correlated to a terminal network voltage. When the remaining capacity decreases, the terminal voltage is lowered. Therefore, the remaining capacity is estimated by measuring the terminal voltage.

In view of the temperature characteristic of the lead battery, when the vehicle is parked with the engine off and navigation device 102 is started to receive information such as traffic information, if the surrounding temperature has fallen to below −10 degrees Celsius, for example, the available discharge capacity is reduced. Because charging is not performed when the car is powered off, the battery may be drained due to the periodic startup of the navigation device 102. Even if the battery is not completely drained due to periodical startup of the navigation device 102, the engine may not immediately start due to the low temperature, and the battery may be further drained by repeated attempts to start the engine.

FIG. 1 depicts an in-vehicle navigation system 100 in which a battery voltage and the surrounding temperature are measured prior to starting navigation device 102 when the vehicle is parked with the engine-off. If the detected temperature is not below a predetermined threshold value, or if a current position of the vehicle is not in a region of low temperature, control device 104 periodically starts navigation device 102 to receive information such as traffic information, news, and map information. If, however, the battery voltage is lower than a predetermined level and the temperature is lower than a predetermined temperature, or if the vehicle is located in a region wherein the temperature is predicted to be lower than a predetermined temperature, start-up of navigation device 102 may be cancelled.

In at least one embodiment, control device 104 includes a determination unit 108 that monitors battery voltage and surrounding temperature data based upon battery voltage detector 122 and temperature sensor 124, respectively. Determination unit 110 determines whether or not the battery voltage and the surrounding temperature are lower than predetermined values, or in at least some embodiments, uses a predicted temperature based upon data stored in storage unit 118 that includes seasonal and location based temperature data. Using this information, determination unit 110 determines whether or not the current position is in an area of predicted low temperature.

According to a determination result, start-up control unit 112 initiates a startup command to navigation device 102 or cancel the start-up. For example, if the temperature detected by temperature sensor 124 is relatively high, or if a predicted temperature is not as low as a predetermined low temperature threshold, the start-up control unit 112 starts navigation device 102 periodically, e.g., every hour during a predetermined period of time for about 10 to 20 minutes while parked with the engine-off. On the other hand, if determination unit 110 determines that the current temperature is, for example, below freezing and the battery voltage has decreased by more than 10%, or if the predicted temperature is about −10 degrees Celsius, control device 104 may determine that the available discharge capacity of the battery (not shown) has been remarkably reduced and cancels start-up of navigation device 102 to prevent draining the battery.

Figure 2:
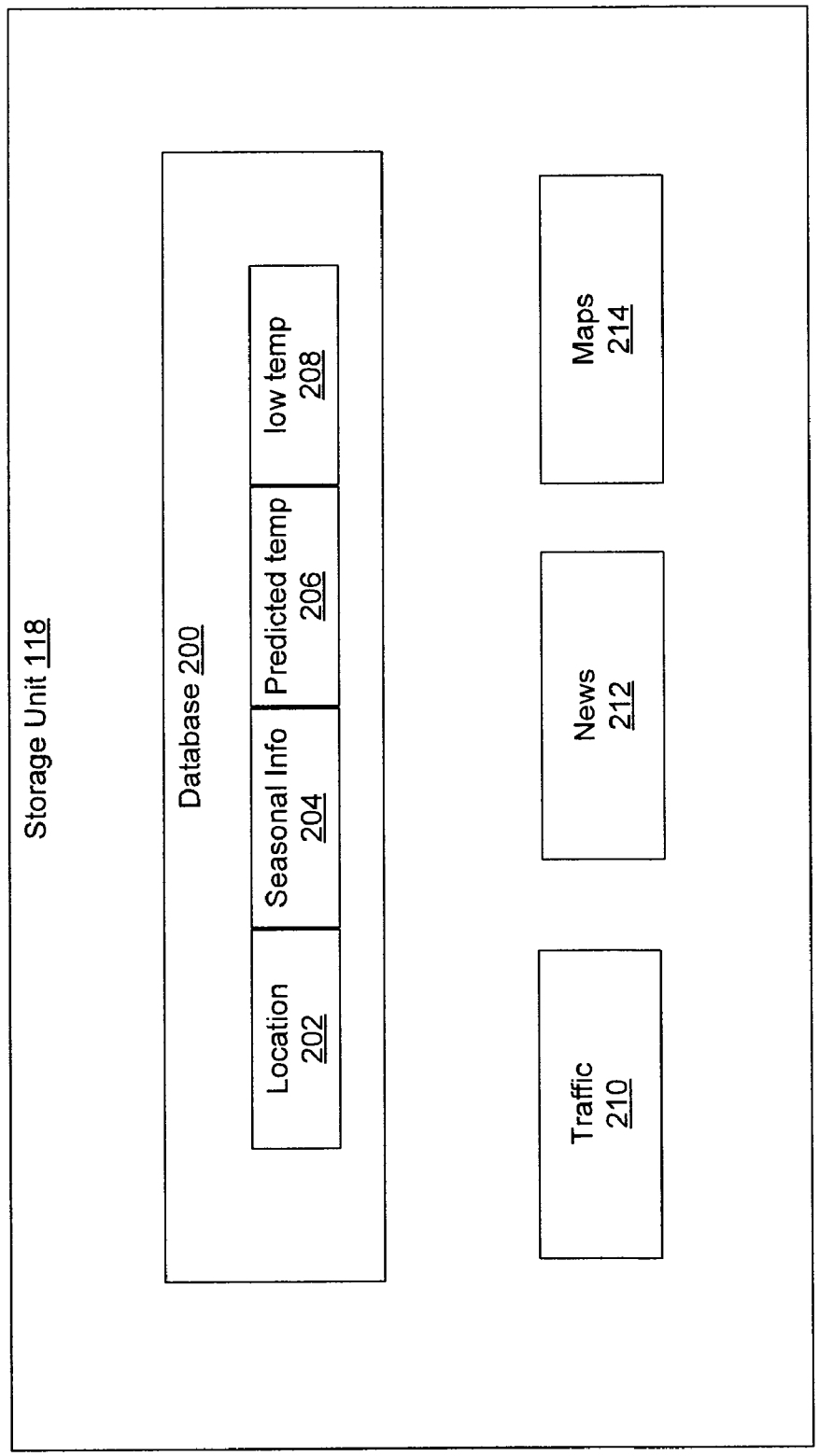
FIG. 2 depicts the contents of a storage unit in accordance with an embodiment of the present invention.

FIG. 2 depicts one embodiment of storage unit 118 that includes temperature database 200 in addition to downloaded traffic 210, news 212, and map 214 information. In at least some embodiments, database 200 includes stores one or more of a predicted temperature 206 and a lowest temperature 208 based upon location information 202 and seasonal information 204, e.g., a date, or a range of dates. In one embodiment, control device 104 may cancel start-up of navigation device 102 upon a determination that a stored lowest temperature 208 value, corresponding to the current position and a current date, is lower than a predetermined threshold temperature value.

In addition, in at least one embodiment, if a date of the next usage of the vehicle is known, start-up of navigation device 102 may be controlled based on the temperature of when the vehicle is used next. As depicted in FIG. 2, in at least some embodiments, historical temperature information is stored in database 200 in storage unit 118 of navigation device 102. In other embodiments, temperature data is stored in an external server (not shown) and is sent to navigation device 102 when required, e.g., at engine turn-off. In still other embodiments, temperature data may be downloaded upon user command or automatically when the navigation device 102 is moved from one geographical region to another.

Figure 3:
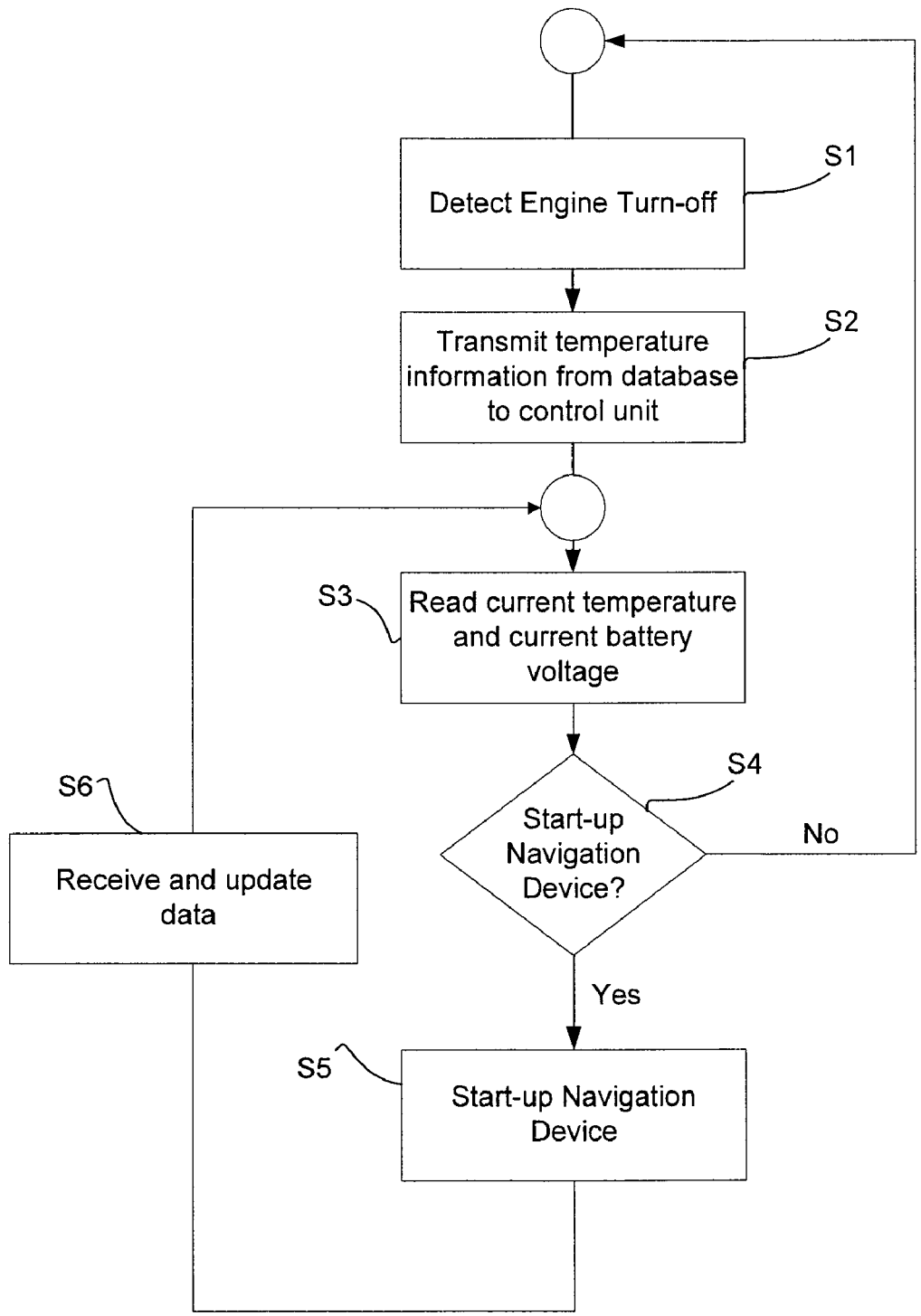
FIG. 3 is a flowchart of one embodiment of the in-vehicle navigation system.

In at least one embodiment, the operation of control device 104 is controlled by a processor 106 executing a program stored in memory device 108. The program, when executed, causes processor 106 to execute the method depicted in the flowchart of FIG. 3. Alternate embodiments of system 100 may include other hardware implementations of the executable software.

In one embodiment, at block S1, the navigation device 102 detects vehicle engine turn-off and at block S2, prior to turning off, navigation device 102 transmits temperature information to control device 104 based upon the output of the current positioning detection unit and the information stored in database 200. At block S3, control device 104 reads current battery voltage information and current temperature information from sensors 124 and 126, respectively. At block S4, based upon the information received and predetermined thresholds, control device 104 determines whether to periodically start up the navigation device 102. At block S5, a start-up command is sent to startup navigation device 102.

In at least one other embodiment, when the engine is turned off, control device 104 automatically refers to the temperature information in storage unit 118 and current position information detected by the current position detection unit 120 at the moment of engine turnoff and determines whether or not the current position is in an area of predicted temperature lower than a predetermined temperature.

At block S6, navigation device 102 is started at which time receiving unit 116 receives external information, e.g., traffic information distributed from a traffic information center, news, map information, etc., and may occur hourly and take approximately 10 to 20 minutes. In some embodiments, the time of start-up, frequency of start-up, and the duration of operation of the navigation device, while the engine is turned off, is predetermined. In some embodiments, these settings are configurable by the user.

As shown in FIG. 2, data pertaining to the received information may be saved in storage unit 118. Alternatively, in at least one other embodiment, only the latest information is saved and is subsequently overwritten with the next received information. Guidance unit 122 outputs on a display screen at least an indication of received information that has been received and stored while the vehicle was in the engine off state. In some embodiments, the information is displayed at a time of engine start-up to alert the user to the availability of the latest information. FIGS. 4A and 4B illustrate the two different information messages rendered on the display screen at engine startup.

FIG. 4A depicts an initial screen displayed at engine start if the traffic information has been received periodically while parked with the engine-off. A message, e.g., "Traffic information received while parked," is provided, indicating the immediate availability of information.

FIG. 4B shows the initial screen displayed at engine start if traffic information has not been received while parked with the engine-off. A message, e.g., "To prevent battery run-out, traffic information was not received while parked," is provided. Such a message calls attention to a possible battery problem, thereby providing an opportunity for prompt action such as a battery change.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a plurality of microprocessors, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, in some aspects, the steps and/or actions of a method or algorithm may reside as one or any combination or set of instructions on a machine readable medium and/or computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An in-vehicle navigation system comprising:
 a navigation device that includes a receiving unit configured to receive information, a storage unit configured to store the received information, and a guidance unit;
 a battery voltage detector;
 a temperature sensor; and
 a control device comprising:
  a determination unit configured to receive a voltage detection output from the battery voltage detector and a temperature output from the temperature sensor, the determination unit configured to determine whether the received voltage detection output is lower than a predetermined value, and whether the temperature output is lower than a predetermined value, and
  a start-up control unit configured to periodically start the navigation device based upon an output of the determination unit.

2. An in-vehicle navigation system comprising:
 a navigation device that includes:
  a receiving unit configured to receive information;
  at least one storage unit configured to store the received information and seasonable temperature information;
  a current position detection unit; and
  a guidance unit configured to output status of the received information; and
 a control device that includes:
  a determination unit configured to receive stored temperature information from the navigation device and generate a determination result of whether or not the current geographic location of the navigation system, detected by the current position detection unit, is in an area where a predicted temperature is lower than a predetermined temperature; and
  a start-up control unit configured to receive the determination result and periodically start the navigation device while the vehicle in which the in-vehicle navigation system is installed is parked in an engine-off state;
 wherein the control device is configured to cancel start-up of the navigation device if a current geographic location of the navigation system is in an area where a predicted temperature is lower than the predetermined temperature.

3. The in-vehicle navigation system according to claim 2, wherein seasonal temperature information and geographical information is stored in the storage unit, and the determination unit is configured to predict that the temperature of the current position is lower than the predetermined temperature if the seasonal lowest temperature information corresponding to the current position and a current date is lower than the predetermined temperature.

* * * * *